US008136433B2

(12) United States Patent
Cahoon

(10) Patent No.: US 8,136,433 B2
(45) Date of Patent: Mar. 20, 2012

(54) FRUIT SLICING SYSTEM AND METHOD OF USE

(76) Inventor: Jeffrey Cahoon, Williamson, NY (US)

(*) Notice: Subject to any disclaimer, the term of this patent is extended or adjusted under 35 U.S.C. 154(b) by 645 days.

(21) Appl. No.: 12/037,462

(22) Filed: Feb. 26, 2008

(65) Prior Publication Data

US 2009/0211418 A1 Aug. 27, 2009

(51) Int. Cl.

| | |
|---|---|
| ***B26D 1/00*** | (2006.01) |
| ***B26D 3/00*** | (2006.01) |
| ***B26D 5/00*** | (2006.01) |
| ***B26D 5/28*** | (2006.01) |
| ***B26D 11/00*** | (2006.01) |
| ***B27B 5/00*** | (2006.01) |
| ***A47J 17/00*** | (2006.01) |
| ***A47J 27/00*** | (2006.01) |

(52) U.S. Cl. ............... 83/36; 83/404.2; 83/365; 83/211; 99/543

(58) Field of Classification Search ........... 83/36, 404.2, 83/409.1, 733, 365; 99/543, 545, 552
See application file for complete search history.

(56) References Cited

U.S. PATENT DOCUMENTS

| | | | | | |
|---|---|---|---|---|---|
| 1,992,714 | A | * | 2/1935 | Nelson | 83/407 |
| 2,108,992 | A | | 2/1938 | Obenshain | |
| 2,114,427 | A | | 4/1938 | Mesterton | |
| 2,335,619 | A | | 11/1943 | Thompson | |
| 2,837,131 | A | | 6/1958 | Fried | |
| 3,114,403 | A | * | 12/1963 | Rianda | 83/407 |
| 3,252,490 | A | * | 5/1966 | Belk | 99/538 |
| 3,319,678 | A | | 5/1967 | Anderson | |
| 3,351,110 | A | | 11/1967 | Willis et al. | |
| 3,754,470 | A | | 8/1973 | Console | |
| 3,842,727 | A | | 10/1974 | Glenn et al. | |
| 4,060,167 | A | | 11/1977 | Smith | |
| 4,112,837 | A | | 9/1978 | Altman et al. | |
| 4,112,838 | A | | 9/1978 | Altman et al. | |
| 4,175,690 | A | | 11/1979 | Bova et al. | |
| 4,184,423 | A | | 1/1980 | Raque et al. | |
| 4,506,777 | A | | 3/1985 | Kampf | |
| 4,554,852 | A | * | 11/1985 | Sauer et al. | 83/407 |
| 4,780,930 | A | * | 11/1988 | Sparkia | 452/165 |
| 4,974,716 | A | | 12/1990 | Yuri et al. | |
| 5,101,718 | A | | 4/1992 | Lin | |
| 5,241,902 | A | | 9/1993 | Gangi | |
| 5,479,543 | A | * | 12/1995 | Black | 385/31 |
| 5,553,547 | A | * | 9/1996 | Miller | 101/485 |
| 5,563,796 | A | * | 10/1996 | Biegger | 700/130 |

(Continued)

OTHER PUBLICATIONS

International Search Report for International Patent Application No. PCT/US09/34019 (Apr. 16, 2009).

(Continued)

*Primary Examiner* — Ghassem Alie
*Assistant Examiner* — Bharat C Patel
(74) *Attorney, Agent, or Firm* — Nixon Peabody LLP

(57) ABSTRACT

An apparatus for cutting fruit. The apparatus includes a frame, at least first and second cutting stations, at least one receptacle in which the fruit is received that includes a plurality of extensions protruding outwardly from an outer circumference thereof, and a conveyor that conveys the receptacle from the first cutting station to the second cutting station. The frame includes a kicker. In use, the object is cut along its vertical axis at the first station, the receptacle is then rotated about its vertical axis as a result of one of the extensions contacting the kicker, and the object is cut at the second station.

9 Claims, 19 Drawing Sheets

U.S. PATENT DOCUMENTS

| | | | | |
|---|---|---|---|---|
| 5,586,479 | A * | 12/1996 | Roy et al. | 83/74 |
| 5,685,210 | A * | 11/1997 | Ringle et al. | 83/13 |
| 5,791,451 | A | 8/1998 | Brown | |
| 5,935,629 | A | 8/1999 | Martin | |
| 5,996,482 | A | 12/1999 | Kirk et al. | |
| 6,112,132 | A * | 8/2000 | Grube | 700/167 |
| 6,865,973 | B1 * | 3/2005 | Hasegawa | 83/13 |
| 7,055,418 | B2 * | 6/2006 | Maddalon | 83/72 |
| 2001/0001434 | A1 | 5/2001 | Daigh et al. | |
| 2004/0069161 | A1 | 4/2004 | Bazzano et al. | |
| 2005/0092194 | A1 | 5/2005 | Bajema et al. | |
| 2005/0159094 | A1 * | 7/2005 | Dunivan | 452/163 |
| 2005/0279228 | A1 | 12/2005 | Julian et al. | |

OTHER PUBLICATIONS

Written Opinion of the International Searching Authority for International Patent Application No. PCT/US/34019 (Apr. 8, 2009).

* cited by examiner

FRUIT SLICING SYSTEM AND METHOD OF USE

FIELD OF THE INVENTION

The present invention relates to a fruit slicing system and method of using same, and more particularly to a fruit slicing machine that slices fruit into a plurality of wedges.

BACKGROUND OF THE INVENTION

The food service industry has a need for sliced fruit. Often the fruit is sliced by hand. This can be inefficient, inconsistent and the sliced fruit has a short shelf life. Accordingly, a need exists for an automated system for slicing fruit that overcomes the disadvantages described above.

SUMMARY OF THE PREFERRED EMBODIMENTS

In accordance with a first aspect of the present invention, there is provided an apparatus for cutting fruit. The apparatus includes a frame, at least first and second cutting stations, at least one receptacle in which the fruit is received that includes a plurality of extensions protruding outwardly from an outer circumference thereof, and a conveyor that conveys the receptacle from the first cutting station to the second cutting station. The frame includes a kicker. In use, the object is cut along its vertical axis at the first station, the receptacle is then rotated about its vertical axis as a result of one of the extensions contacting the kicker, and the object is cut at the second station. In a preferred embodiment, the at least one receptacle is mounted on and rotatable with respect to a mounting plate, the extensions define a rotational path, the mounting plate includes a brake mechanism extending upwardly therefrom, and the brake mechanism is in the rotational path of the extensions.

In accordance with another aspect of the present invention, there is provided a method of slicing fruit. The method includes the steps of placing the fruit in a receptacle, positioning the receptacle in a first position, conveying the receptacle along a path on a conveyor to a first cutting station, cutting the fruit in half along its vertical axis at the first cutting station, rotating the receptacle about its vertical axis to a second position, conveying the fruit to a second cutting station, and cutting the fruit in half along its vertical axis, thereby providing at least four pieces of the fruit. In a preferred embodiment, the method includes the step of checking the alignment of a blade with respect to slots in the receptacle before the receptacle reaches the first cutting station. In another preferred embodiment, the method includes the step of not cutting the fruit in half along its vertical axis at either of the cutting stations if the receptacle is not in proper alignment.

In accordance with another aspect of the present invention, there is provided an apparatus for cutting fruit. The apparatus includes a frame, at least first and second cutting stations that each include a blade affixed to a weighted arm that is pivotally connected to the frame, a conveyor that conveys the object in a receptacle with a plurality of diametrically opposed slots defined in the side wall thereof and a plurality of extensions protruding outwardly from an outer circumference thereof from the first cutting station to the second cutting station, a stationary block affixed to the frame between the first and second cutting stations, and a first alignment mechanism disposed along the conveyor before the first cutting station and a second alignment mechanism disposed along the conveyor before the second cutting station. The stationary block is in the path of one of the plurality of extensions, such that when the extension contacts the stationary block, the receptacle is rotated about its vertical axis. The blade and weighted arm pivot if the blade comes into contact with the receptacle.

In accordance with yet another aspect of the present invention, there is provided a car for use in an apparatus for cutting objects. The car includes a mounting plate, and a receptacle positioned above the mounting plate and rotatable with respect to the mounting plate. The receptacle includes a plurality of diametrically opposed slots defined in a side wall thereof and a plurality of extensions protruding outwardly from an outer circumference thereof. In a preferred embodiment, the receptacle includes a plurality of detents defined in a bottom surface thereof, and the mounting plate includes at least one spring biased ball bearing extending upwardly therefrom. The detents define a rotational path and the at least one ball bearing is received in one of the detents to stop the rotation of the receptacle. In another preferred embodiment, the car includes two axles, and at least one of the axles is movable in a direction that is generally parallel to a plane defined by a top surface of the mounting plate.

BRIEF DESCRIPTION OF THE DRAWINGS

Like numerals refer to like parts throughout the several views of the drawings.

DESCRIPTION OF THE PREFERRED EMBODIMENTS

Figure 1A:
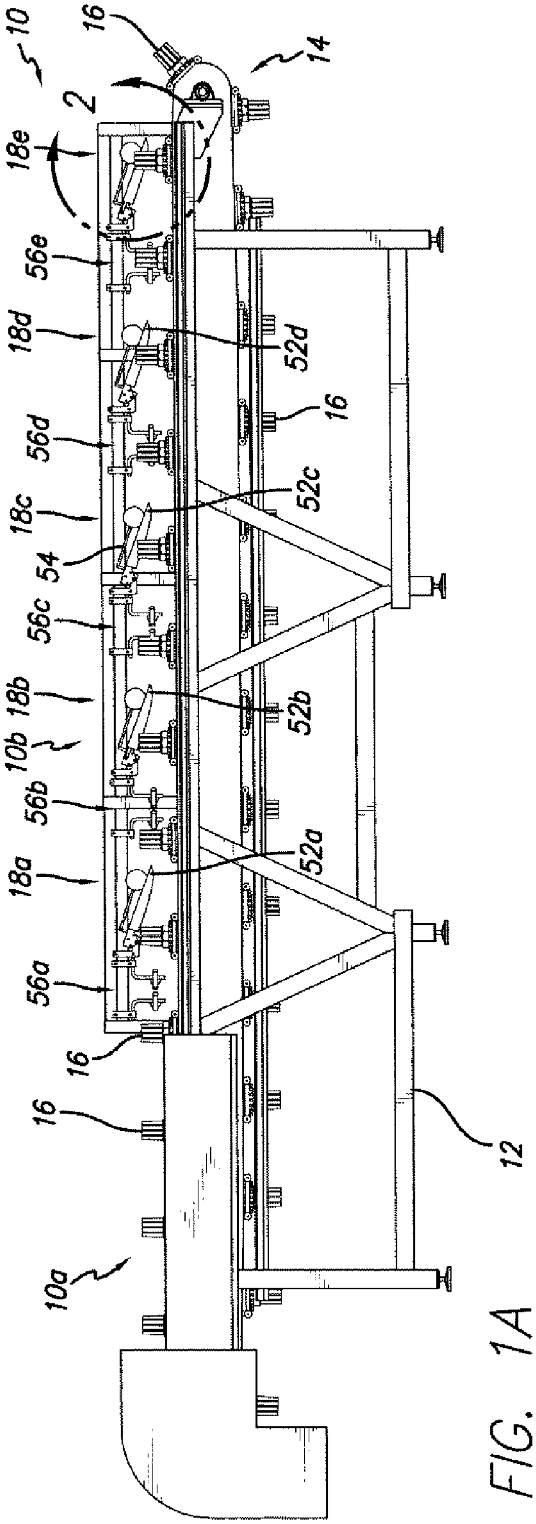
FIG. 1A is a side elevational view of a fruit slicing machine in accordance with a preferred embodiment of the present invention.

As shown in the drawings, for purposes of illustration, the invention is embodied in an apparatus and system for cutting fruit or other objects into sections or wedges.

For exemplary purposes only, described hereinbelow is a preferred embodiment wherein the apparatus is used to slice fruit. However, this is not a limitation on the present invention. It will be understood that the apparatus and system can be used to cut any item, such as meat, cheese or other food stuffs, etc. Other uses for the apparatus and system will be readily apparent to those skilled in the relevant art.

It will be appreciated that terms such as "front," "back," "top," "bottom," "side," and the like used herein are merely for ease of description and refer to the orientation of the components as shown in the figures. It should be understood that any orientation of the apparatus, and the components thereof described herein is within the scope of the present invention.

FIG. 1 shows a side elevational view of the entire fruit slicing apparatus or machine 10 with the front portion (as viewed in the figure) of the top of the frame around the conveyor removed to show the various cars, cutting stations and alignment mechanisms. Referring to FIGS. 1-7, generally, the fruit slicing machine 10 includes a frame 12, a conveyor 14, a plurality of cars 16 and a plurality of cutting stations 18*a*-18*e* (the cutting stations in general are all referred to herein generically as 18). It will be understood that any number of cutting stations 18 can be used and that the number of cutting stations 18 is not a limitation on the present invention.

The fruit slicing apparatus 10 provides an automated system for slicing fruit. The plurality of cars 16 each comprise a cylindrical fruit cutting receptacle 20 that is secured to an intermediate ring 19, which, in turn is secured to a mounting plate 21. The receptacle 20 is divided into a plurality of upwardly extending segments 22 that define a plurality of vertically oriented, diametrically opposed slots 24. The fruit cutting receptacle 20 does not have to be cylindrical, but the cylindrical shape provides the best opportunity for multiple fruit slices, as is described below.

The fruit cutting receptacles 20 are each sized and configured to accommodate the desired fruit in the interior thereof. It will be appreciated by those skilled in the art that the fruit cutting receptacles 20, and therefore, the cars 16 are sized to accommodate specific fruit and shaped accordingly to place the fruit in the proper slicing orientation.

As mentioned above, the receptacle 20 is divided into segments 22 which define a predetermined number of aligned/opposed slots 24 depending on the number of fruit slices desired. In the exemplary embodiment shown in the figures, the receptacle 20 includes ten slots 24 (which accommodate cuts, thereby creating ten slices of fruit).

It will be understood that the opposed slots 24 are preferably spaced evenly about the circumference of the receptacle 20 so that the fruit can be cut into the preferred form with a knife or other sharp instrument at each of the cutting stations 18 (described below).

Figure 4:
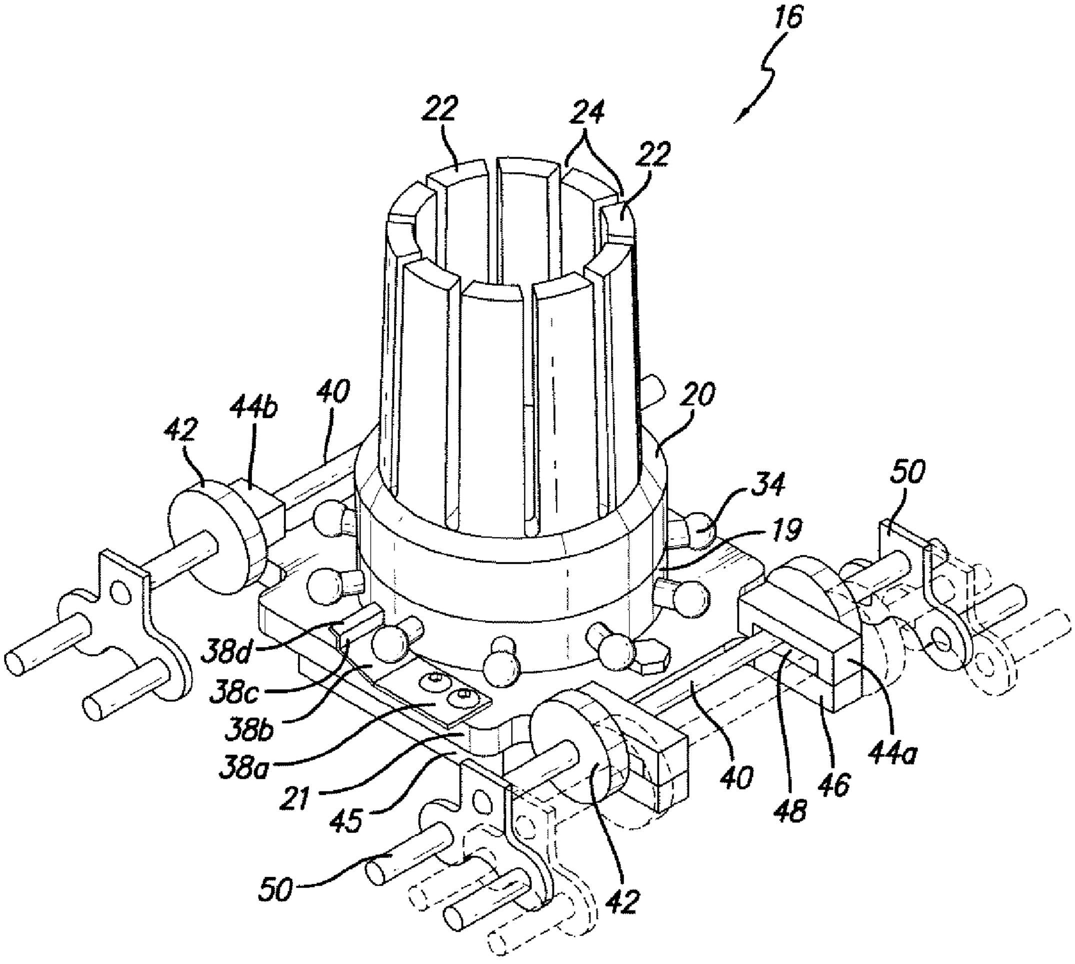
FIG. 4 is a perspective view of a car.
Figure 5A:
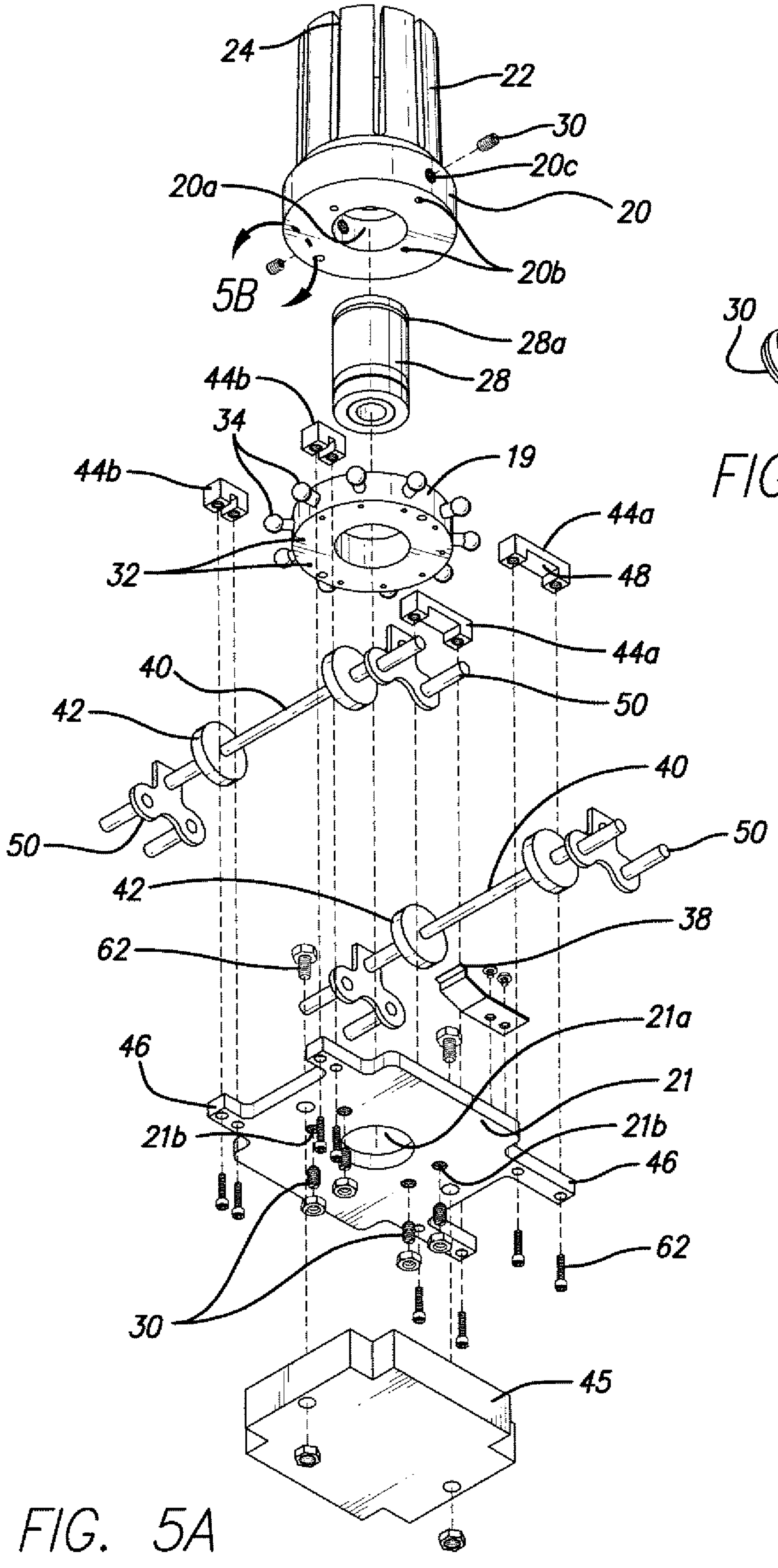
FIG. 5A is an exploded view of the car of FIG. 5.
Figure 5B:
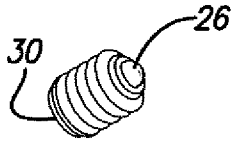
FIG. 5B is a detailed perspective view of a set screw with ball bearing from the car of FIG. 5A.

With reference to FIGS. 4-5B, in a preferred embodiment, the car 16 includes a turning pin 28 that extends through openings 20*a*, 19*a*, and 21*a* in the center of the receptacle 20, intermediate ring 19 and mounting plate 21, respectively. The turning pin 28 allows the intermediate ring 19 and receptacle 20 to rotate. Preferably, the turning pin 28 is machined or sized to fit intermediate ring 19 and mounting plate 21 and is held in place by a threaded collar. In a preferred embodiment, opening 20*a* in receptacle 20 is sized so that it fits snuggly on turning pin 28, but so that it can be removed. This allows for interchangeability with different receptacles 20 for different sized fruit. In another embodiment, the receptacle 20 can be permanently secured on turning pin 28.

To promote interchangeability, in a preferred embodiment, the bottom surface of the receptacle 20 includes openings 20*b* that are received in posts (not shown) that extend upwardly from the intermediate ring 19. The receptacle 20 can also include ball bearings 26 or the like that are received in a groove 28*a* on turning pin 28. In a preferred embodiment, the bearings 26 can be included in the ends of set screws 30 (similar to that shown in FIG. 5B) that are threaded through openings 20*c* in receptacle 20. These set screws 30 and bearings 26 hold the receptacle 20 on the car and also provide a quick release mechanism for removing the receptacle 20 from the car. In another embodiment, the ball bearings 26 can be positioned in the inside wall of receptacle 20.

As shown in FIG. 5A, in a preferred embodiment, the intermediate ring 19 includes a plurality of detents 32 defined in the bottom thereof to receive ball bearings 26 that protrude from the top of the mounting plate 21. These detents 32 help define the positions at which the fruit receptacle 20 stops. In other words, the detents 32 are provided for selectively stopping the rotation of the receptacle 20 as desired at each station (described more fully below). In a preferred embodiment, the mounting plate 21 includes threaded openings 21*b* therein for receiving set screws 30 that include the ball bearings 26 in the ends thereof. In this embodiment, the set screws 30 are threaded through the openings so that the ball bearings 26 extend just above the top surface of the mounting plate 21. This allows the force required to rotate the intermediate ring 10 and receptacle 20 to be adjusted (by threading the set screws in or out to provide more or less resistance). It will be understood that these ball bearings 26 are biased upwardly by a spring.

The intermediate ring also preferably includes a plurality of equally spaced machine balls or extensions 34 protruding from the outer surface or circumference thereof. Between each cutting station 18, the machine balls 34 interact with a kicker or stationary block 36 (see FIG. 7) mounted on the frame 12 for rotating the receptacle 20 about its vertical axis to the desired position. The rotation of the fruit receptacle 20 is actuated by the kicker 36, which cooperates with the machine balls 34 and a brake mechanism 38 (see FIG. 4) on the mounting plate 21 that stops the rotation at the desired location (described more fully below).

In a preferred embodiment, mounting plate 21 also includes a pair of axles 40. The axles 40 each include a pair of wheels 42 mounted thereon that engage tracks 43 (described below) for helping convey the car 16 from one cutting station 18 to the next. The axles 40 and wheels 42 can be rotatably secured to the mounting plate 21 (or other portion of the car 16) by any known method. In the exemplary embodiment shown in the figures (see, e.g., FIGS. 4 and 5A), the axles 40 are secured by u-shaped members 44*a* and 44*b* that are threadably attached to extensions 46 on the mounting plate 21. In a preferred embodiment, one set of the u-shaped members 44*a* are elongated, thereby defining a slot 48. This slot allows the axle 40 positioned in slot 48 to move (see the hidden lines in FIG. 4). As a car 16 approaches the end of conveyor 14, as a result of the geometry of the conveyor 14, the distance between the axles 40 increases. Slot 48, allows for this to happen. Typically, the axles 40 will be positioned as shown in solid lines in FIG. 4 when the associated car 16 is traveling on the top or bottom of the conveyor 14 and one of the axles 40 will be positioned as shown in hidden lines in FIG. 4 when the associated car 16 is rounding one of the ends of the conveyor 14.

Figure 1B:
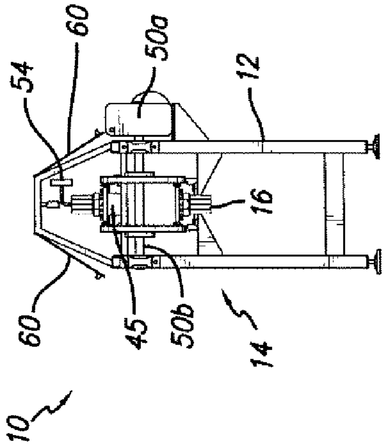
FIG. 1B is a right end elevational view of the fruit slicing machine of FIG. 1A.

As shown in FIGS. 1B, 4 and 5A, in a preferred embodiment, the cars 16 also include an alignment block 45 secured to the bottom of the mounting plate 21. This alignment block 45 extends downwardly between the tracks and is sized to provide a tight clearance on either side with the tracks. This helps keep the car 16 aligned and moving in the desired direction. In a preferred embodiment the block 45 is made of a rigid plastic. However, it can be made of other materials, such as a metal or wood.

As is shown in the figures, many of the components of the car 16 are secured together by various threaded fasteners 62. However, this is not a limitation on the present invention.

Figure 6:
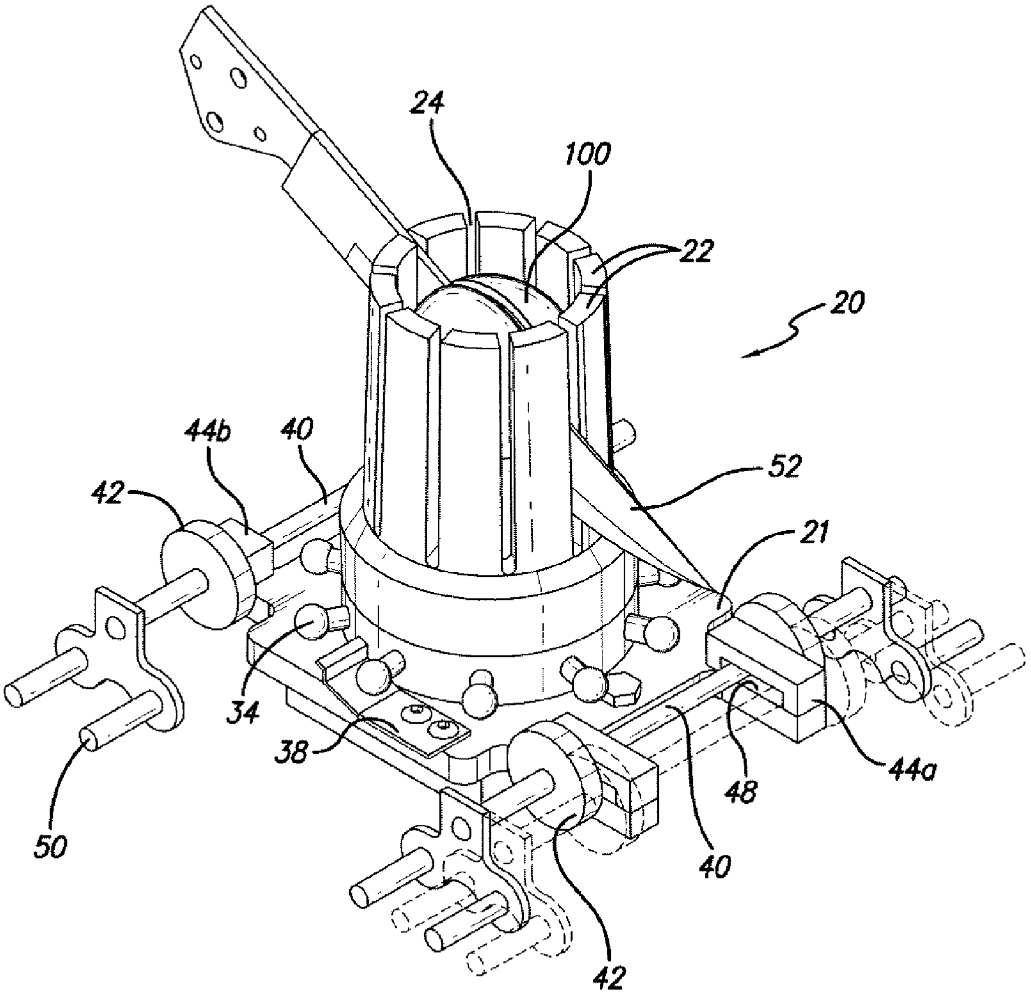
FIG. 6 is a perspective view of a car going through a cutting station.

In a preferred embodiment, the conveyor 14 utilizes a chain 50 for conveying the cars 16 in cooperation with the tracks 43. Portions of the chain 50 are shown in FIGS. 4, 5A and 6. As shown in the figures, a portion of the chain (a link) is attached to the ends of the axles 40. As will be understood by those skilled in the art, the chain 50 is driven by a motor 50*a* and includes a pair of axles 50*b* and sprockets (not shown) at opposite ends of the conveyor 14. In the preferred embodiment the conveyor is chain driven. However, it will be appreciated by those skilled in the art that the conveyor can utilize any known method of conveying. For example, the conveyor can utilize a belt or belts, a pulley system or the like.

Generally, a plurality of fruit receptacles 20 (which are each part of a car 16) are spaced apart and mounted onto the conveyor 14, which transports the receptacles 20 between the plurality of cutting stations 18. As a result of a machine ball 34 interacting with a stationary block 36, the receptacle 20 is rotated into cutting alignment prior to entering the cutting station 18. The receptacle 20 (and intermediate ring 19) rotates a predetermined amount and is secured by the brake mechanism 38 prior to reaching the cutting station 18.

With reference to FIGS. 1A-2 and 6, each cutting station 18*a*-18*e* includes a knife blade 52*a*-52*e* (the knife blades are referred to generically herein as 52). The number of blades 52 (and, therefore, cutting stations) can be varied according to the desired number of cuts in the fruit. It will be understood that each set of slots 24*a*-24*e* is associated with a cutting station 18*a*-18*e*.

Figure 2:
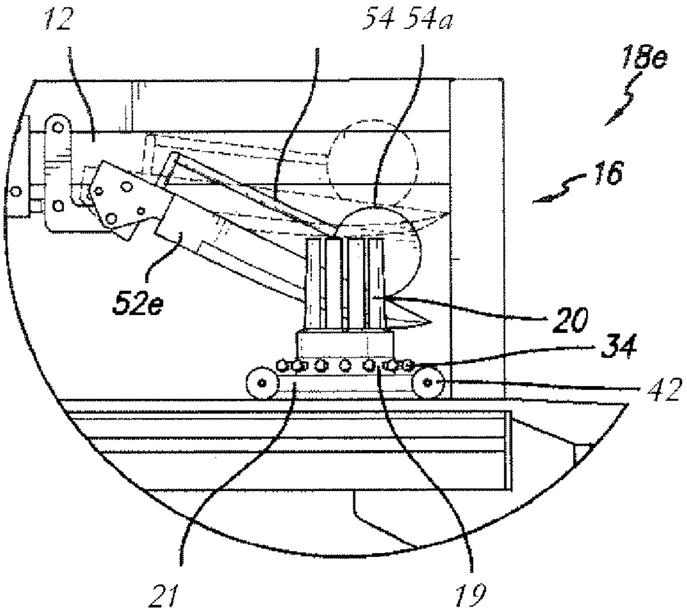
FIG. 2 is a detailed side elevational view of a portion of FIG. 1A showing a cutting station and car.

In a preferred embodiment, the blades 52 are pivotably mounted to or cantilevered to the frame 12 (or from a component extending from the frame, as shown in FIG. 2). Preferably, each blade 52 includes a weighted arm 54 that extends approximately parallel to and outwardly therefrom such that the weight is near the tip of the blade 52. It will be understood that as the car 16 (and receptacle 20 containing the fruit 100) move through a station, the blade 52 does not move. It enters the receptacle 20 through a slot 24, slices through the fruit 100 and exits the receptacle 20 through the opposing slot 24. The weight 54*a* on the end of arm 54 is selected so that it is heavy enough to keep blade 52 in the cutting position (see the solid lines in FIG. 2) while the blade 52 slices through the fruit.

The weighted arm 54 coupled with the pivotability of the blade 52 (and arm 54) provides a measure of safety to protect the blades 52 and receptacles 20. If a car 16 enters a cutting station 18 with a slot 24 misaligned or a blade 52 bent, and the blade 52 strikes an extension 22, the blade 52 will ride up the receptacle 20 (see the hidden lines in FIG. 2). After the car 16 passes through the station, the weight 54*a* will cause the blade 52 and arm 54 to fall back down to the cutting position (see the solid lines in FIG. 2). In a preferred embodiment, the blades 52 are provided with a number of degrees of adjustability, thereby allowing a user to adjust the cutting position for different fruits and different sized receptacles.

In yet another embodiment of the invention, the pivotability of blade 52 and the weighted arm can be omitted. In this embodiment, the blades 52 are permanently secured in the cutting position and the safety element provided by the weighted arm and pivotability is left out.

In yet another embodiment of the invention, the fruit can be cut by alternative methods. For example, the blades can move vertically, like a guillotine or can be hydraulically or pneumatically operated.

Figure 3A:
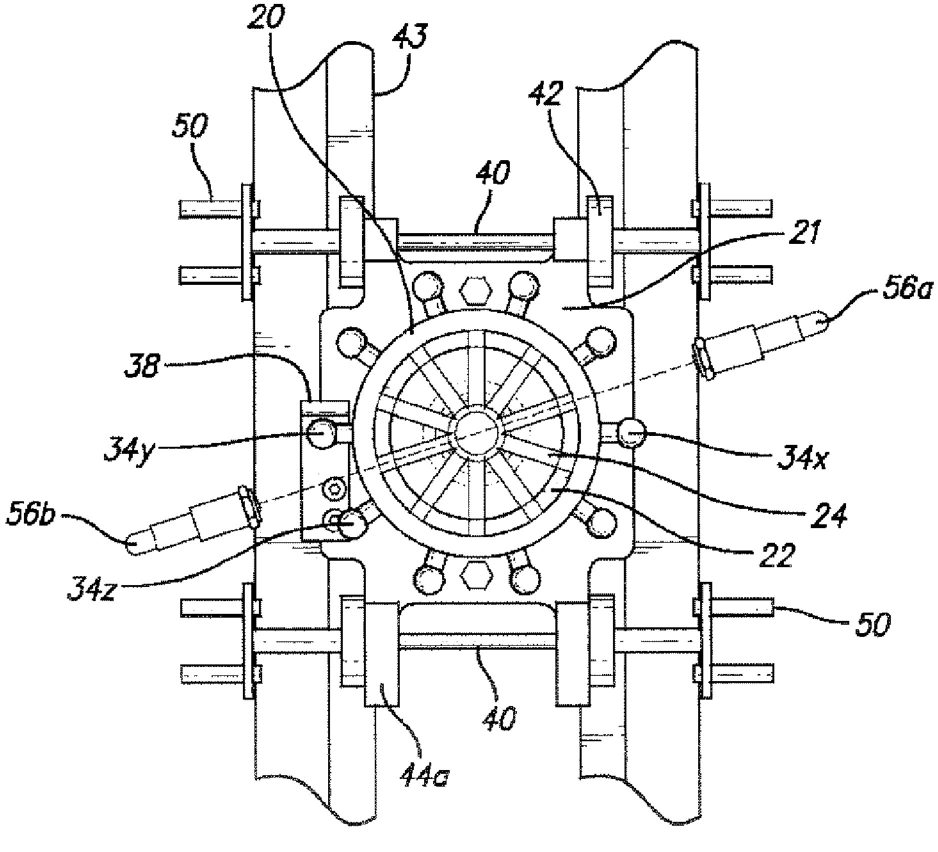
FIG. 3A is a top plan view of a car showing the laser when the receptacle is properly aligned.
Figure 3B:
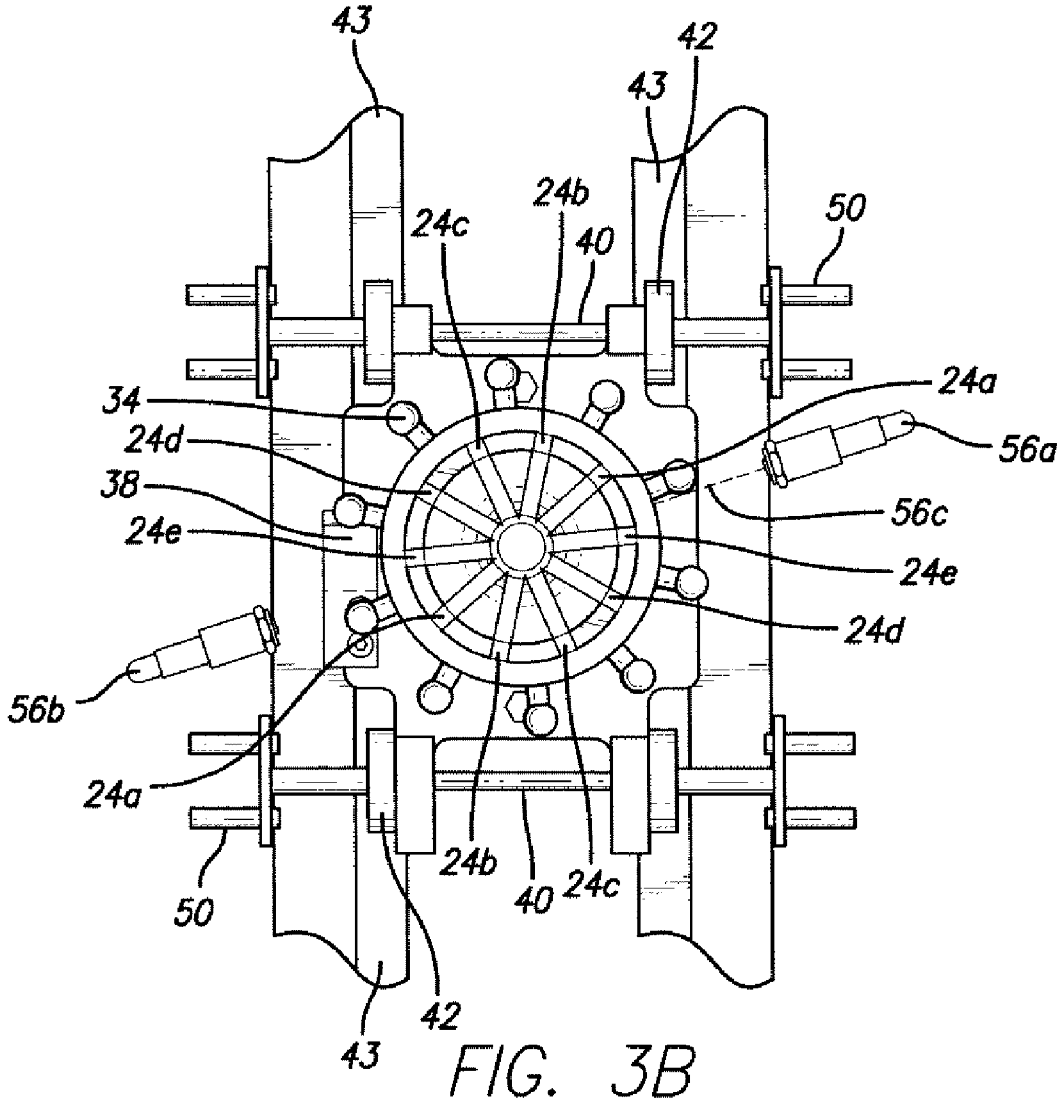
FIG. 3B is a top plan view of a car showing the laser when the receptacle is misaligned.

As shown in FIGS. 1 and 3A-3B, in a preferred embodiment, the fruit slicing apparatus 10 includes a mechanism 56 for checking the alignment of the slots 24 in the receptacle 20 before the receptacle 20 enters a cutting station 18 to make sure that the knife blade 52 and slots 24 are properly aligned. In a preferred embodiment, the alignment mechanism 56 utilizes a laser. In this embodiment, the alignment mechanism 56 includes a sender 56*a* and a receiver 56*b*. Prior to entering the first cutting station 18*a* (and each cutting station 18 thereafter), a laser 56*c* checks for slot alignment. The laser alignment mechanism 56 is used to check the alignment of the receptacle 20 prior to cutting in cooperation with a computer program which functions to sense the laser stop mechanism or receiver 56*b*. In operation, the sender 56*a* emits a laser 56*c* that is intended to travel through the slots 24 in the receptacle 10 (in FIGS. 3A and 3B cutting station 18*a* is used). If the slots 24 are properly aligned, the laser 56*c* will travel through both slots 24 and will be received by the receiver 56*b*. If the slots 24 are misaligned, the laser 56*c* will be blocked and will not be received by the receiver 56*b*. At this point the fruit cutting apparatus 10 shuts down, thereby preventing damage to the knife blade 52 caused by the blade 52 striking the receptacle 20.

Figure 17:
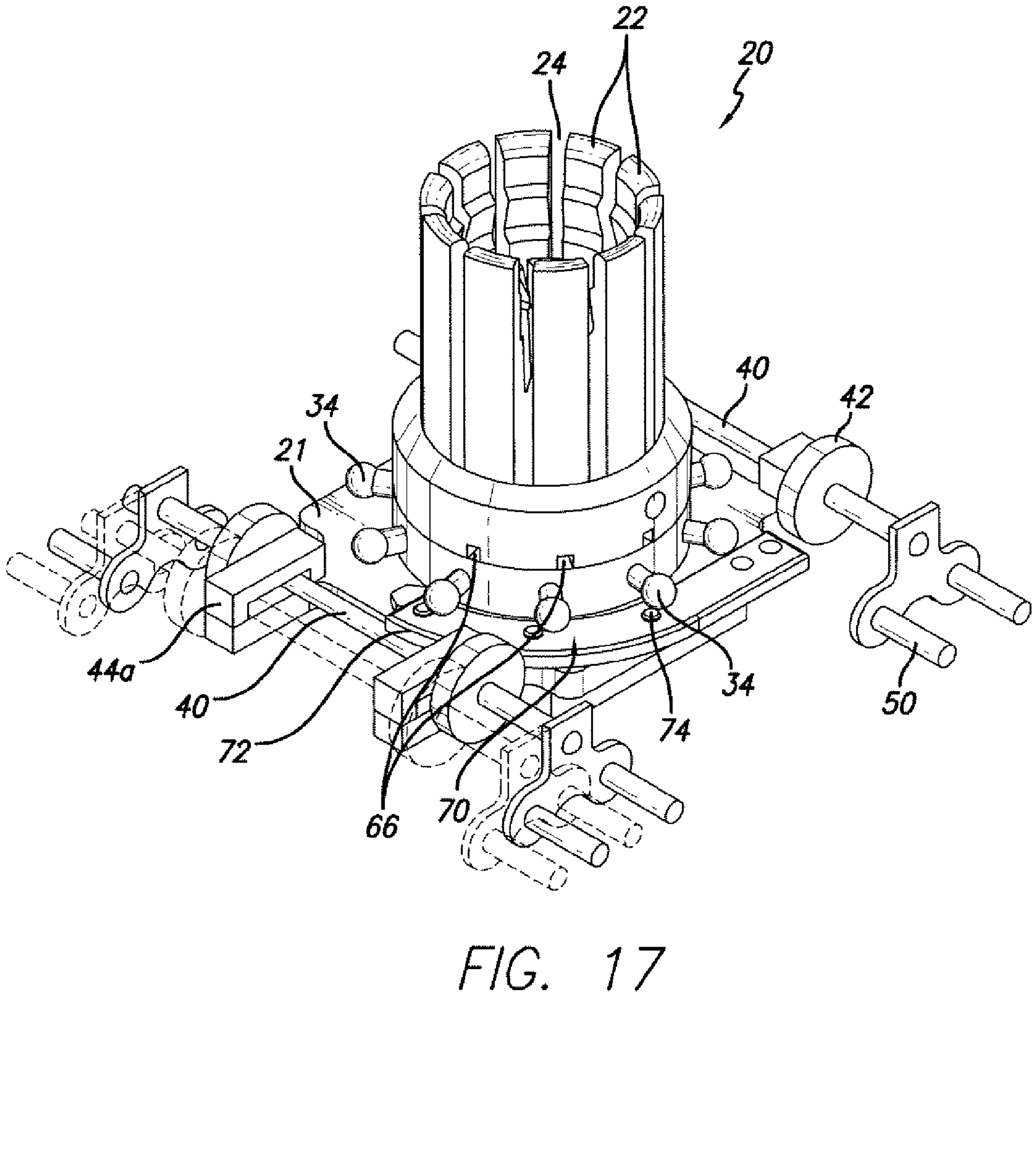
FIG. 17 is a perspective view of a car showing another embodiment of a brake mechanism and the alignment channels.
Figure 18:
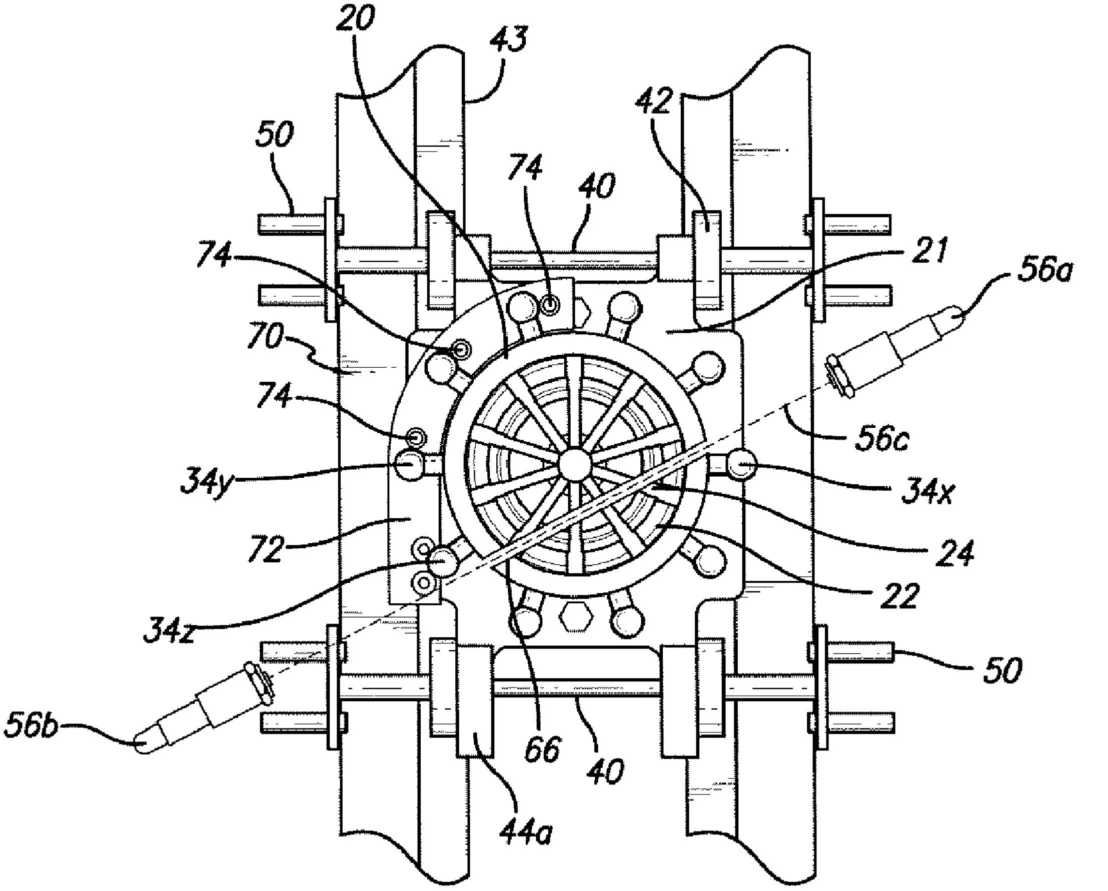
FIG. 18 is a top plan view of a car showing the brake mechanism of FIG. 16 and showing a portion cut away to show the laser extending through an alignment channel.
Figure 19:
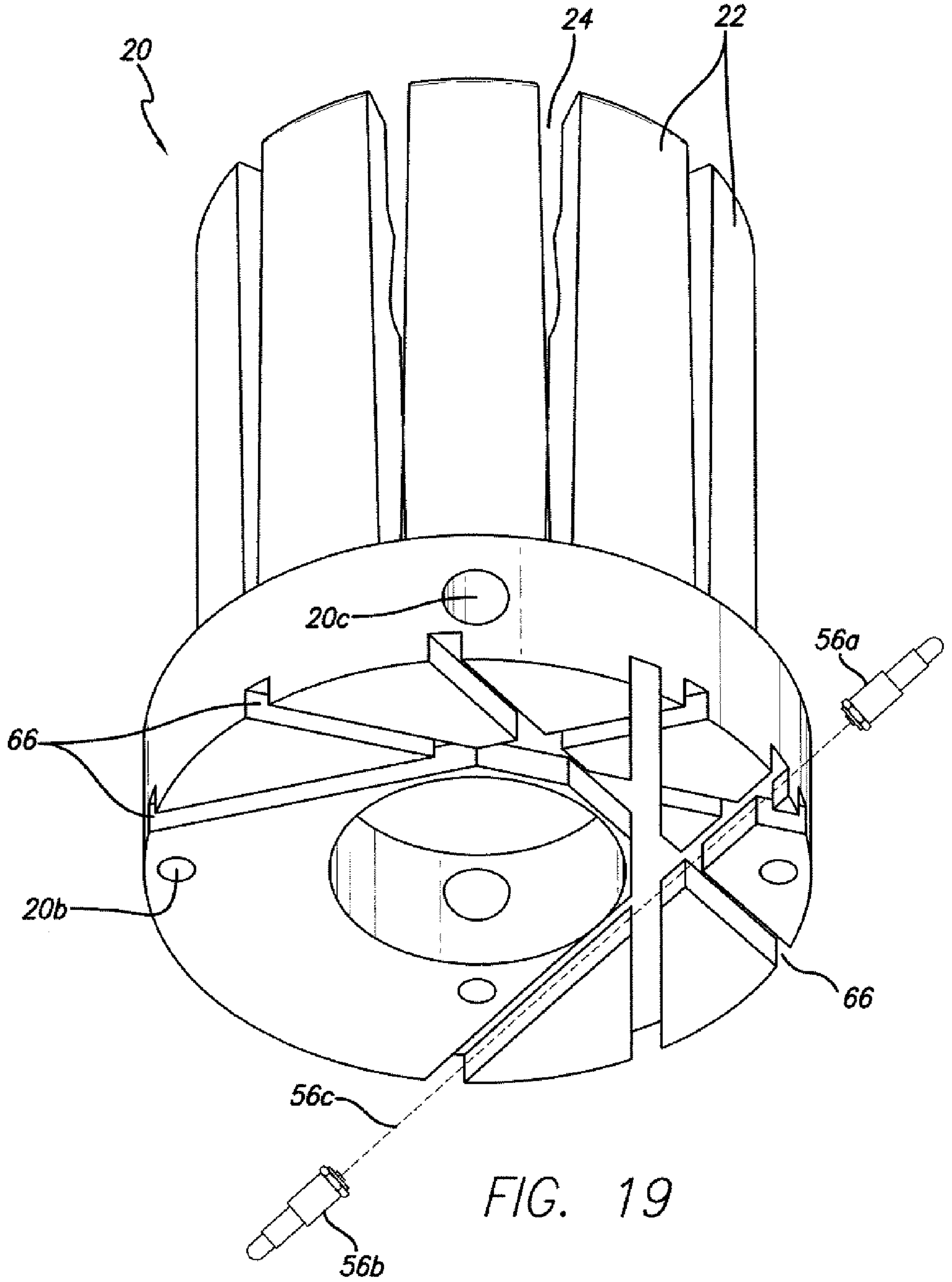
FIG. 19 is a perspective view of a receptacle with a plurality of alignment channels in the bottom thereof.

As shown in FIGS. 17-19, in another embodiment, the receptacle 20 can have alignment channels 66 defined in the bottom thereof. Preferably, the receptacle 20 includes a plurality of alignment channels 66 that correspond to the different sets of laser alignment mechanisms 56. It will be understood that as the receptacle 20 is rotated between cutting stations 18, that a different alignment channel 66 will be used than the previous cutting station 18. In use, as is shown in FIGS. 18-19, if the receptacle 20 is in the properly aligned position as it crosses the laser 56*c*, the laser 56*c* will travel through the alignment channel 66 and will be received by the receiver 56*b*. If the receptacle 20 is misaligned, the laser 56*c* will be blocked (because it does not enter alignment channel 66) and will not be received by the receiver 56*b*, at which point the fruit cutting apparatus 10 will shut down.

Figure 7:
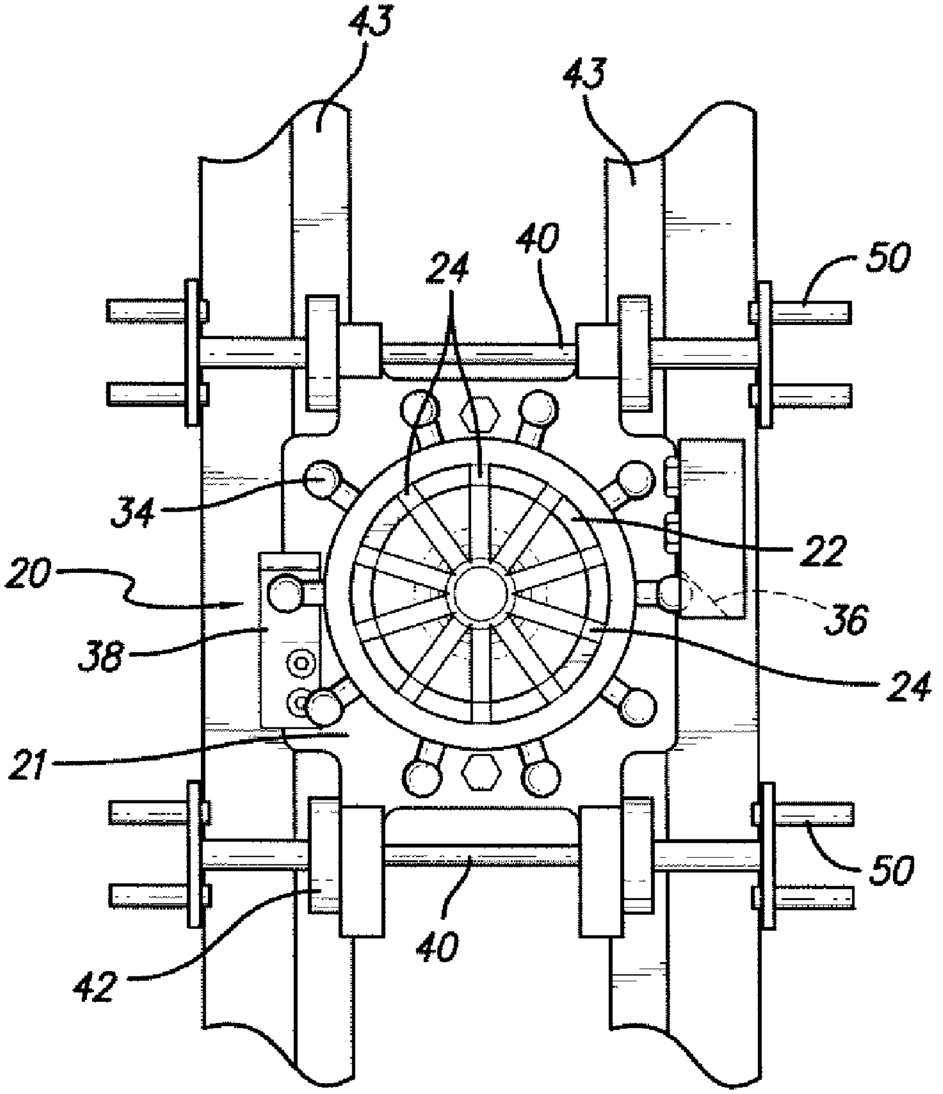
FIG. 7 is a is a top plan view of a car showing one of the machine balls contacting the kicker just prior to rotation of the receptacle.

As mentioned above, the receptacle 20 (and intermediate ring 19) are rotated between each cutting station 18 by a kicker 36. As shown in FIG. 7, as the car 16 is conveyed along tracks 43, the machine ball 34 that extends outwardly from intermediate ring 19 at an approximate right angle with respect to the direction of motion strikes kicker 36. Preferably, kicker 36 includes an angled surface 36*a* that helps push machine ball 34 in the desired direction, but, at the same time, allows it to pass the kicker 36 as the intermediate ring 19 rotates.

As intermediate ring 19 begins to rotate, because they are spring biased upwardly, the ball bearings 26 extending upwardly from the mounting plate 21 come out of the detents 32 in which they currently rest. The ball bearings 26 ride along the bottom surface of intermediate ring 19 along a circular path until they each reach the next detent 32 in their path (see FIG. 5). At this point, because the corresponding machine ball 34 is no longer being pushed by a kicker 36, the ball bearings 26 are pressed upwardly into the detents 32 and rotation stops. The receptacle 20 is now ready to enter the next cutting station 18 and the next set of slots 24 are properly aligned.

To ensure that the receptacle stops its rotation at the proper time, in a preferred embodiment, the car 16 also includes a brake mechanism 38. As is best shown in FIGS. 3A and 4, the brake mechanism 38 is a piece of spring metal that has a first portion 38*a* that is secured to the mounting plate 21, a second portion 38*b* that angles upwardly from the first portion 38*a*, a third portion 38*c* that extends upwardly from the second portion 38*b*, and a fourth portion 38*d* that extends outwardly from the third portion 38*c*. As can be seen in FIGS. 3A and 4, the brake mechanism 38 prevents the machine ball 34 from overrotating. In other words, the brake mechanism 38 (and, in particular, third portion 38*c*) stops the rotation of the intermediate ring 19 at the end of its rotation when it is abutted by a machine ball 34.

The brake mechanism 38 can also move downwardly to allow a machine ball 34 to pass. FIG. 3 will be used to describe this. Looking at FIG. 3, three machine balls have been labeled 34*x*, 34*y* and 34*z*. When machine ball 34*x* hits a kicker 36, the machine ball that is approximately 180° therefrom (machine ball 34*y*) is abutted against brake mechanism 38. As a result of the force placed on machine ball 34*x* by the kicker 36, the round shape of machine ball 34*y*, the spring properties of brake mechanism 38, and the space between second portion 38*b* and the top surface of mounting plate 21, the first, second and third portions 38 are pressed downwardly, thereby allowing machine ball 34*y* to ride over the brake mechanism 38 as machine ball 34*x* is pushed by kicker 36. After machine ball 34*y* passes, brake mechanism 38 is biased back into place. Then second portion 38*b* (along with the corresponding detents 32 and ball bearings 26 described above) stops the rotation of machine ball 34*z* thereby stopping the intermediate ring 19 and receptacle 20.

FIGS. 17-18 show another embodiment of a brake mechanism 70. In this embodiment, brake mechanism 70 comprises a track member 72 that is secured to the mounting plate 21 and a plurality of spring biased buttons 74. The buttons 74 prevent the machine ball 34 from overrotating. However, similar to the brake mechanism 38 described above, the buttons 74 can also move downwardly to allow a machine ball 34 to pass. The description above with respect FIG. 3 is applicable here. However, when machine ball 34*x* hits a kicker 36, not only is the machine ball that is approximately 180° therefrom (machine ball 34*y*) abutted against a button 74, two other machine balls 34 are abutted against buttons 74. As a result of the force placed on machine ball 34*x* by the kicker 36, the round shape of machine ball 34*y* and the upward spring biasing of button 74, the buttons 74 abutted by the spring balls 34 are pressed downwardly, thereby allowing the machine balls 34*y*, etc. to ride over the buttons 74 as machine ball 34*x* is pushed by kicker 36. After the machine balls 34 pass, buttons 74 are biased back into place. Then, the buttons 74 stop the rotation of the next machine ball 34 thereby stopping the intermediate ling 19 and receptacle 20.

It will be understood that intermediate ring 19 can be omitted or can be unitary with receptacle 20. In other words, machine balls 34, detents 32 and the other parts of intermediate ring 19 can be part of receptacle 20.

As can be seen in FIG. 1, the machine 10 includes a loading area 10*a* and a cutting area 10*b*. In operation, a piece of fruit 100 is loaded into the receptacle 20 somewhere along the loading area 10*a*. This can be done by hand or by an automated method. The receptacle then travels through the first alignment mechanism 56 where the proper alignment of slots 24*a* is checked (as described above) and is then conveyed to the first cutting station 18*a*. At this point, the first knife 52*a* enters the slots 24*a* to slice the fruit in half as the receptacle 20 passes through the first cutting station 18*a*. The receptacle 20 exits the first cutting station 18*a*, and, as a result of interaction between the machine ball 34 and kicker 36, is rotated so that the next set of slots 24*b* are in alignment with the second knife blade 52*b*. The receptacle 20 passes through the second alignment mechanism 56, and the receptacle 20 then enters the second cutting station 18*b* where the second knife blade 52*b* slices the fruit in half. It will be understood that because the fruit has already been sliced once by the time it reaches the second cutting station 18*b* it is not technically being cut "in half." However, the piece of fruit as whole is being cut in half. In other words, at each cutting station 18, the fruit is cut through its vertical axis, thereby halving the original whole fruit. In the end, this provides an even number of slices of fruit, as shown in FIG. 6. This process continues until the desired number of slices are made.

After the receptacle 20 has passed all of the cutting stations 18, the fruit slices are removed therefrom. In a preferred embodiment, the receptacle 20 turns under the conveyor 14, as shown in FIG. 1A, when reaching the end and the fruit slices tip out of the receptacle 20 and into a collecting bin (not shown). The sliced fruit is collected at the end of the conveyor.

Figure 8:
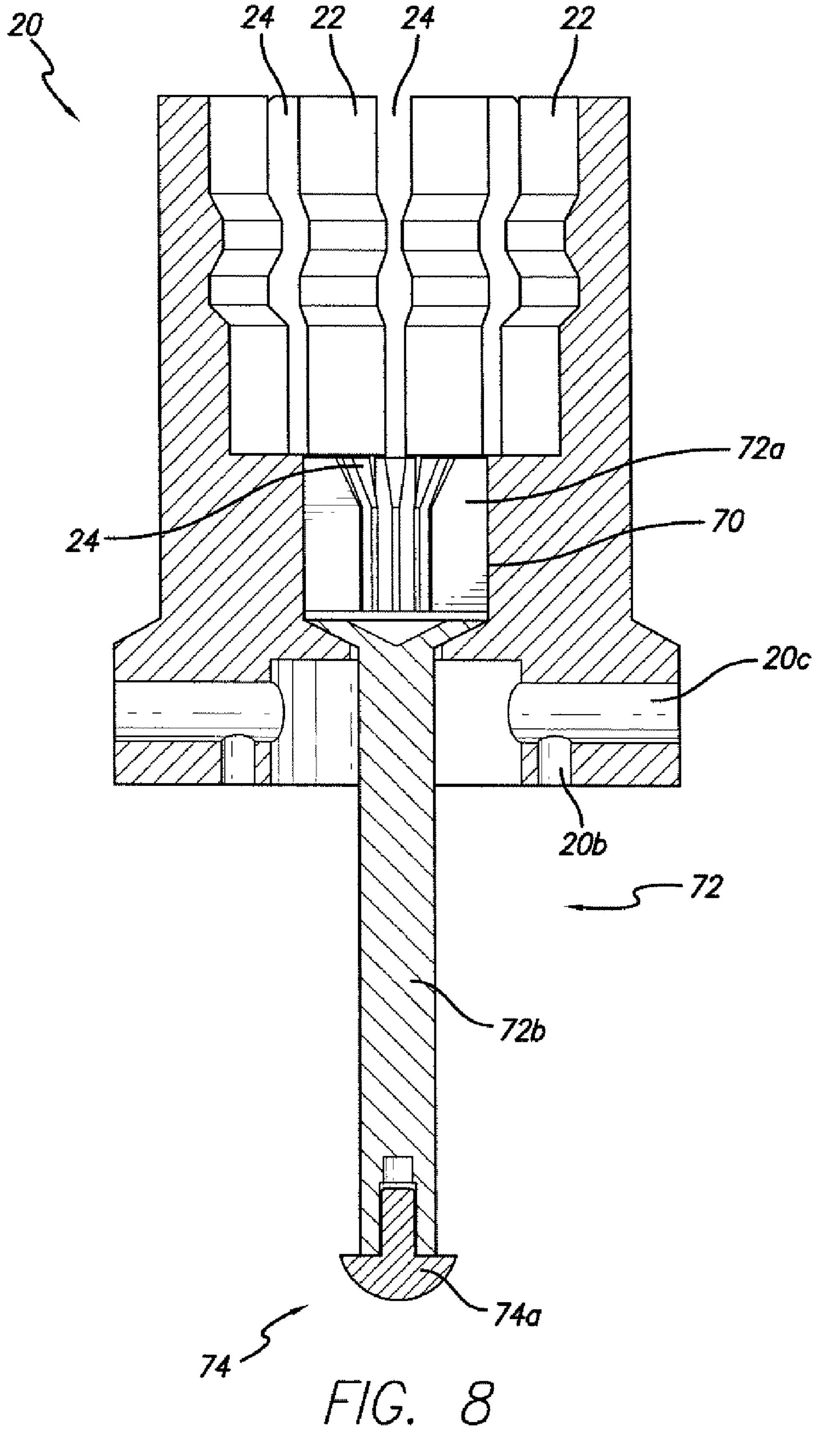
FIG. 8 is a cross sectional elevational view of a receptacle having a pusher in the non-actuated position in accordance with a preferred embodiment of the present invention.

With reference to FIGS. 8-12, in another embodiment, the machine 10 can include a system for pushing the fruit out of or ejecting the fruit from the receptacles. As shown in FIG. 8, the receptacle 20 includes an opening 70 defined axially therethrough through which a pusher 72 extends. The pusher 72 includes a head 72*a* and a shaft 72*b*. The head 72*a* includes slots 24 therein that align with slots 24 in the receptacle 20 when the pusher 72 is in the non-actuated position. As is shown in FIG. 8, in the non-actuated position, the top surface of the head 72*a* is flush with the bottom of the opening in the receptacle 20 where the fruit sits. In a preferred embodiment, the shaft 72*b* includes an opening therein in which a plug 74 is received (this is preferably done by a press fit). The plug 74 includes a curved head 74*a*, which engages a pusher track 76 (described below). In another embodiment, the plug can be omitted and the bottom of the shaft can be shaped to engage the track 76.

Figure 10:
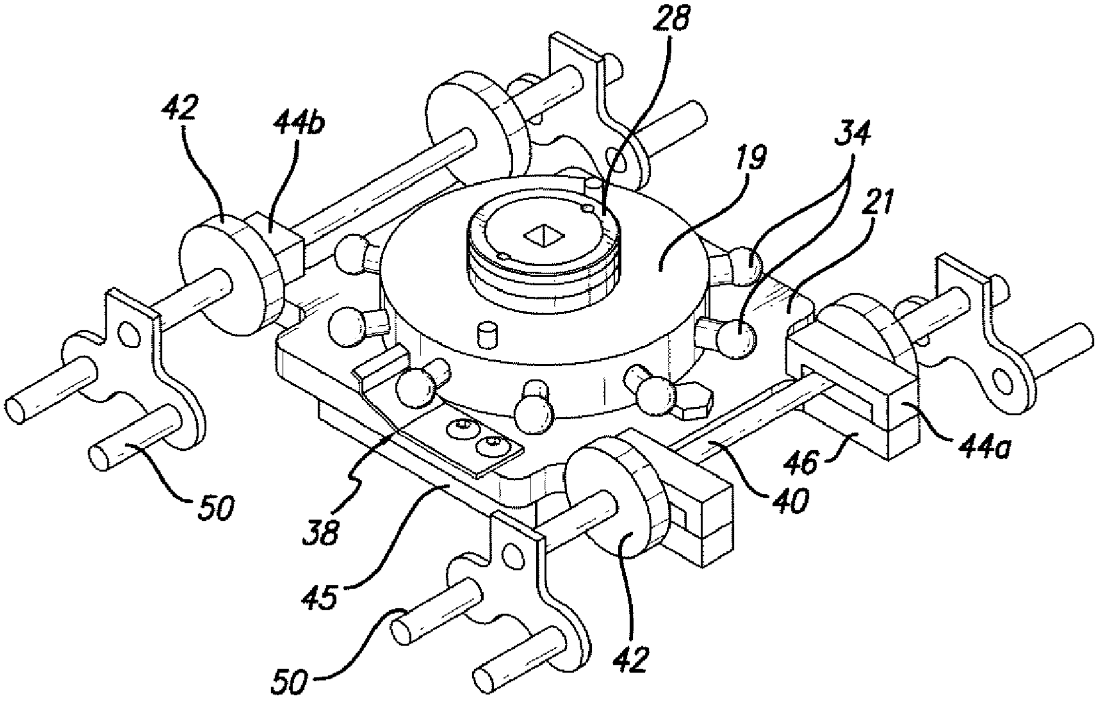
FIG. 10 is a perspective view of a portion of a car that works with the receptacle of FIG. 8.

FIG. 10 shows a modification to turning pin 28 (described above) so that it can be used with the pusher 72 shown in FIG. 8. Shaft 72*b* of the pusher can be shaped other than square. It will understood that shaft 72*b* is long enough that it extends through turning pin 28 and through the bottom of car 16 (through mounting plate 21 and alignment block 45), as shown in FIG. 11.

Figure 9:
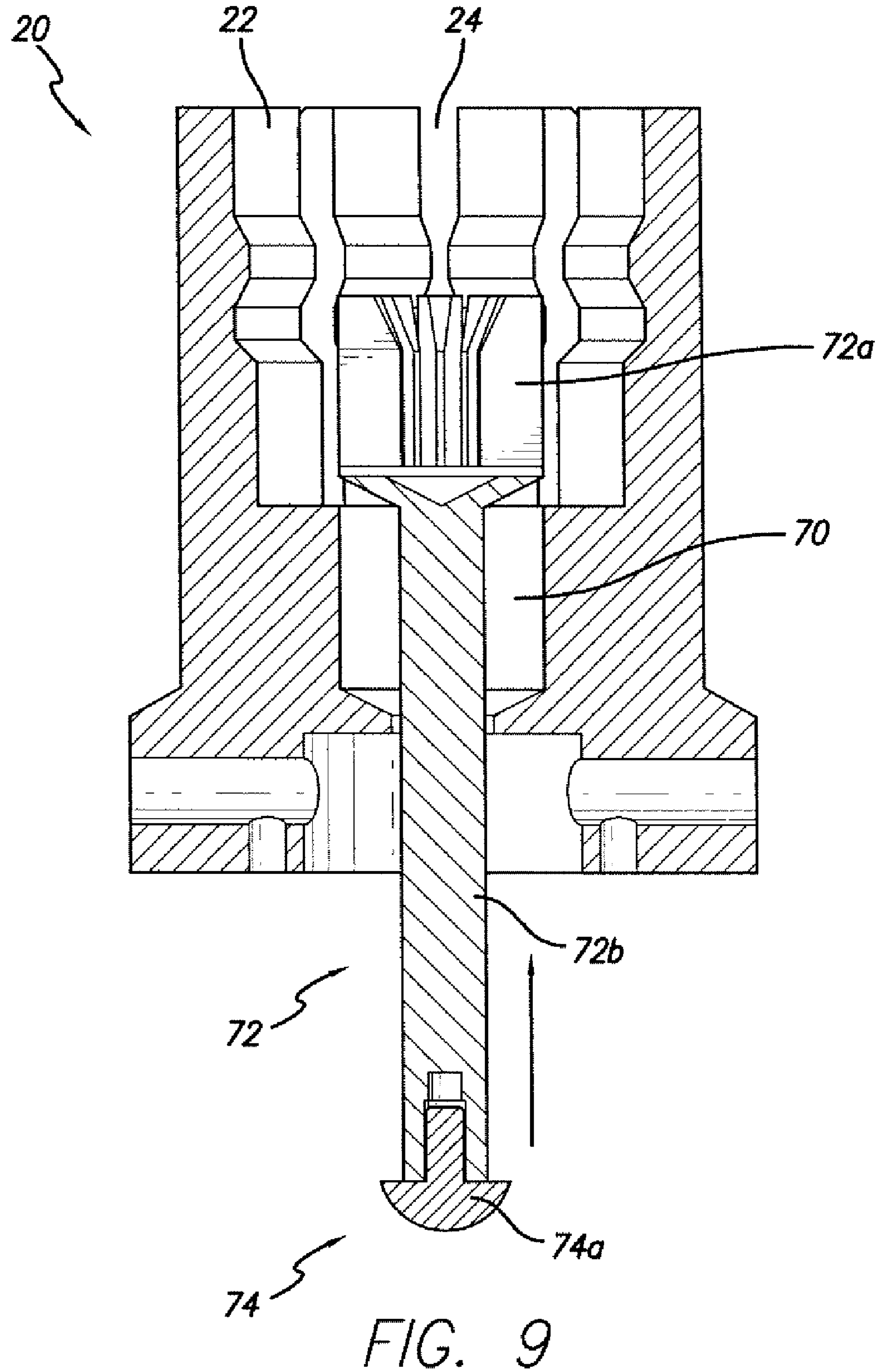
FIG. 9 is a cross sectional elevational view of the receptacle of FIG. 8 with the pusher in the actuated position.
Figure 11:
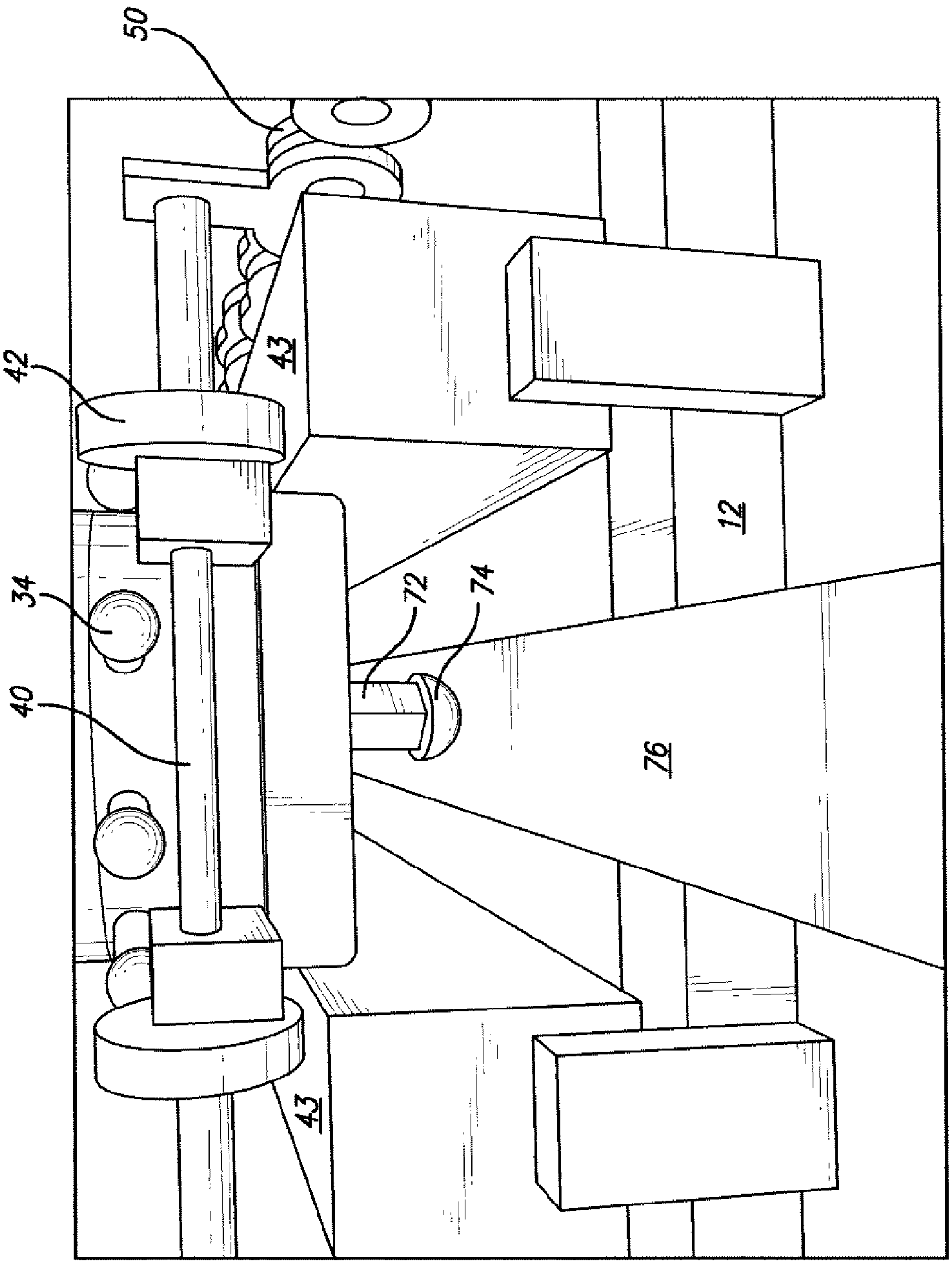
FIG. 11 is a perspective view of the receptacle of FIG. 8 with the pusher on a pusher track.
Figure 12:
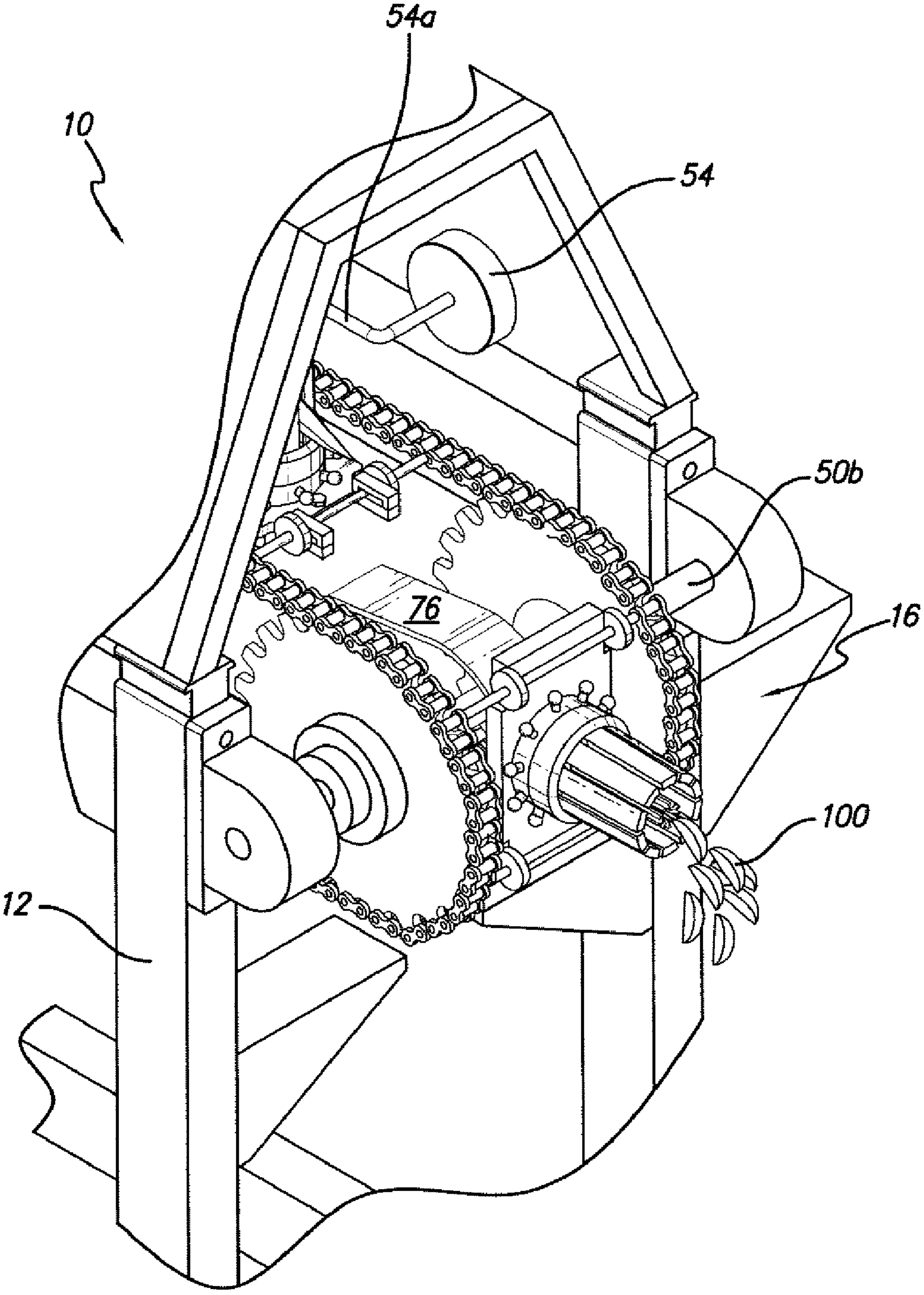
FIG. 12 is a perspective view of a car with the receptacle of FIG. 8 thereon showing the fruit being dumped out of the receptacle.

The pusher track 76 is best shown in FIGS. 11-12. As shown in FIG. 12, in a preferred embodiment, the pusher track 76 is angled or inclined with respect to the path that the cars 16 are conveyed along. In operation, after a car 16 has passed all of the cutting stations 18, the plug 74 of the pusher 72 engages the track 76. Because the track 76 is inclined, the track pushes the pusher (and the fruit thereon) upwardly until it reaches the actuated state as is shown in FIG. 9. Then, when the car 16 reaches the end of the conveyor 14 and begins to tip, as described above, it is easier for the fruit to fall out the cup, as is shown in FIG. 12. It will be understood that the pusher and pusher track shown are only exemplary, but that other methods of pushing the fruit upwardly so that it falls out of the receptacles easier is within the scope of the present invention.

The sliced fruit is optionally treated prior to entering a storage bag. Optionally, the sliced fruit can be treated in the storage bag. The invention provides increased yield, in for example lemon slices, as compared to fruit cut by hand. Further, increased shelf life of the sliced fruit may be obtained.

Figure 13:
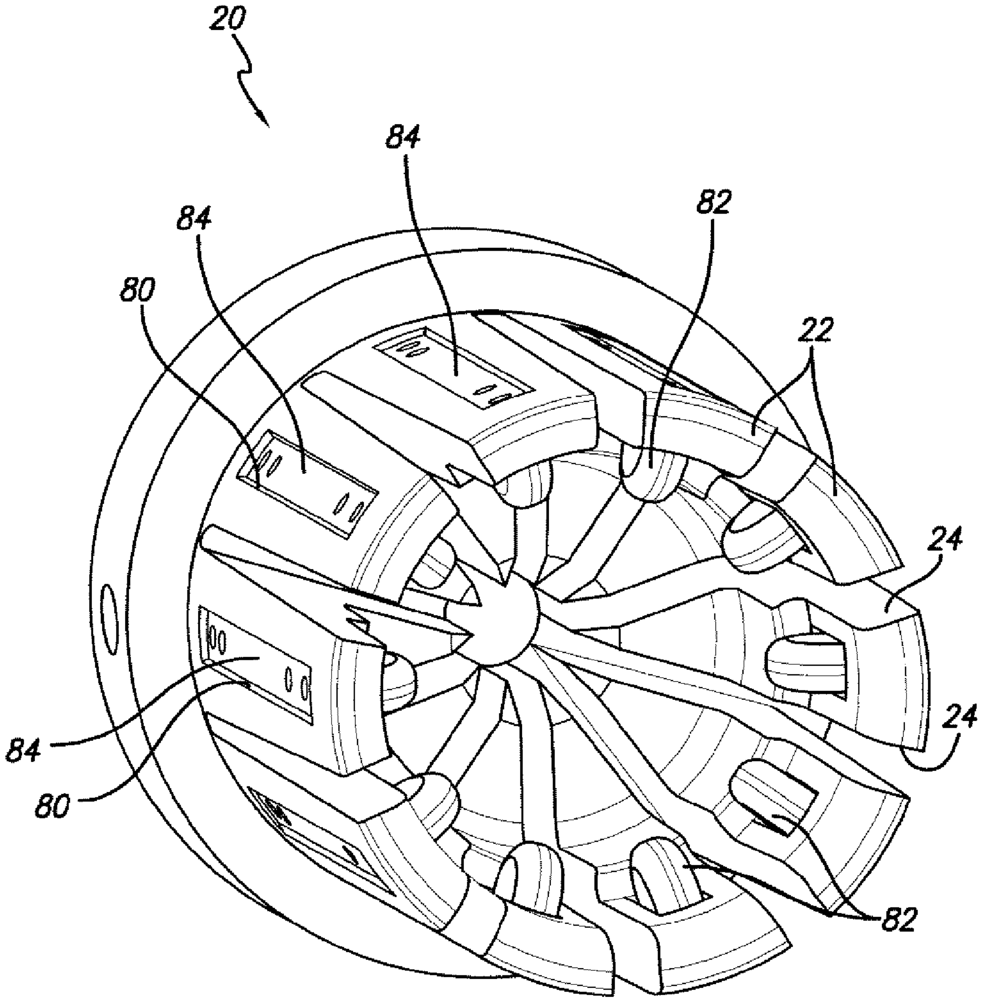
FIG. 13 is a perspective view of a receptacle having a fruit centering system in accordance with a preferred embodiment of the present invention.
Figure 14:
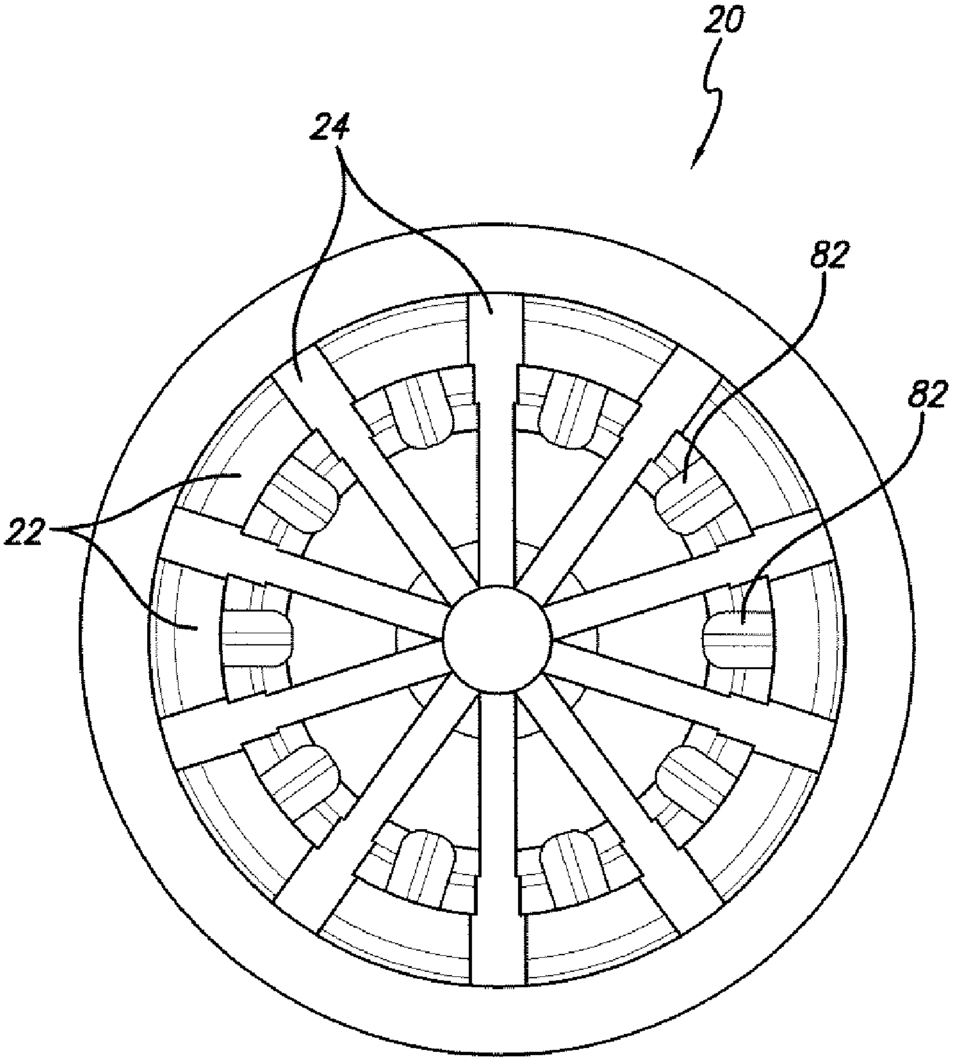
FIG. 14 is a top plan view of the receptacle of FIG. 13.
Figure 15:
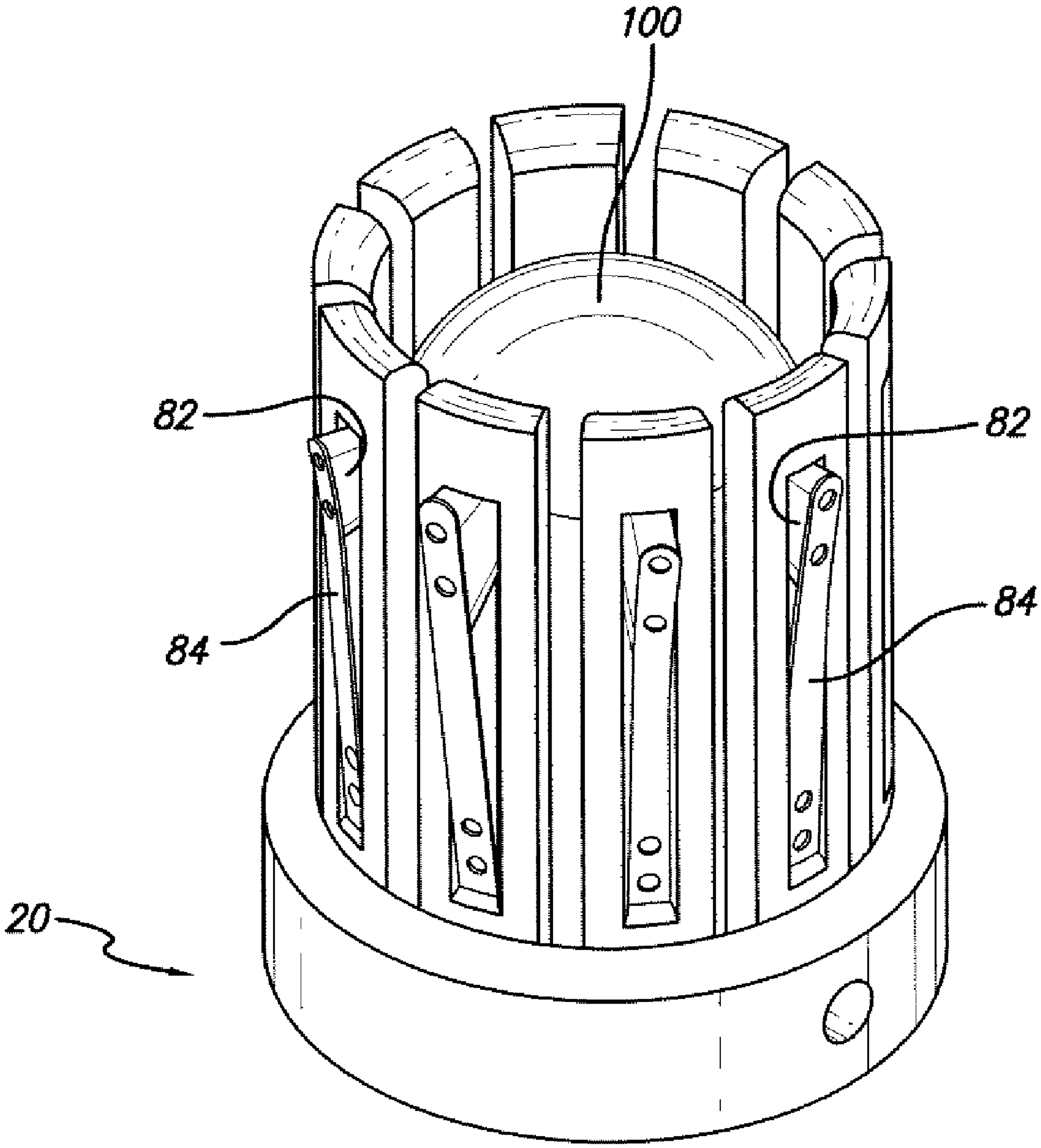
FIG. 15 is a perspective view of the receptacle of FIG. 13 showing a piece of fruit therein.

FIGS. 13-15 show another embodiment of a fruit receptacle 20 with a centering system. In this embodiment, a plurality of the upwardly extending segments 22 include openings 80 defined therein that cooperate with a plurality of spring biased knobs 82 that extend through the openings an into the interior of the receptacle 20 and help center the fruit therein. As shown in FIG. 13, in a preferred embodiment, the knobs 82 are mounted on (or may be unitary with) a strip of spring metal 84. The spring strip 84 is attached by riveting, screwing or otherwise adhering to the upwardly extending segment 22 such that the knob 82 located adjacent an end thereof extends through opening 80. Therefore, as shown in FIG. 15, when a piece of fruit is placed in the receptacle 20, the pressure on the knobs 82 from the fruit 100 bends the spring strips outwardly 84. However, the spring strips 84 are biased enough that they help hold and center the fruit 100 in the receptacle. This helps provide more uniform slices.

Figure 16:
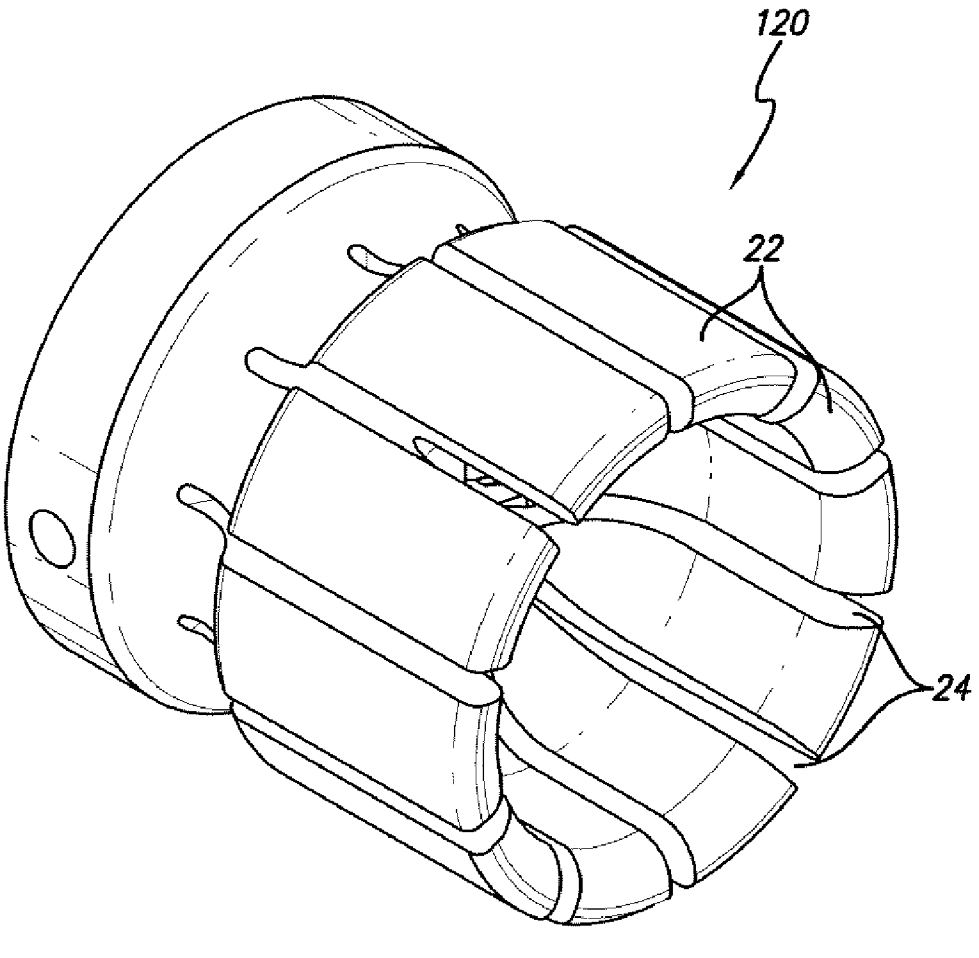
FIG. 16 is a perspective view of a another receptacle in accordance with a preferred embodiment of the present invention.

FIG. 16 shows another embodiment of a fruit receptacle 120. This receptacle 120 is sized for tomatoes. It will be understood that the receptacle can be sized differently to accommodate different fruits or items intended to be sliced.

It will be understood that the machine 10 can also include components such as those that are known on automated conveyor type machines. For example, as shown in FIG. 1B, the machine 10 may include safety doors 60 that provide access to the working area. The machine may be designed to automatically shut off if one of these doors is raised.

The foregoing embodiments are merely examples of the present invention. Those skilled in the art may make numerous uses of, and departures from, such embodiments without departing from the spirit and the scope of the present invention. Accordingly, the scope of the present invention is not to be limited to or defined by such embodiments in any way, but rather, is defined solely by the following claims.

What is claimed is:

1. An apparatus for cutting an object, the apparatus comprising:

(a) a frame comprising two parallel rails, wherein the frame comprises at least one kicker comprising an angled surface and mounted to one of the rails, (b) at least first and second cutting stations each having a single cutting mechanism, wherein the at least one kicker is positioned between each cutting station, (c) at least one receptacle that includes a plurality of vertically oriented, diametrically opposed wall segments defining a plurality of vertically oriented, diametrically opposed slots in the side wall thereof, an intermediate ring secured to the wall segments having a plurality of equally spaced extensions protruding outwardly from an outer circumference thereof, wherein the extensions each comprise a machine ball having a rounded surface, and a mounting plate secured to the intermediate ring by a turning pin in the center thereof which allows the intermediate ring and wall segments to rotate about an axis relative to the mounting plate, wherein the machine balls define a rotational path and the mounting plate includes a spring-biased brake mechanism affixed thereto in the rotational path of the machine balls which contacts the rounded surface of the machine ball, wherein the object is received in the at least one receptacle, and (d) a conveyor that conveys the at least one receptacle from the first cutting station to the second cutting station, and wherein upon each cut the object is cut through a first slot along a vertical axis and through the opposing slot at the first station, the receptacle is then rotated about the vertical axis as a result of the rounded surface of the machine ball of one of the extensions contacting the angled surface of the kicker that both helps push the machine ball in the desired direction and allows the machine ball to pass the kicker and the rounded surface of the machine ball of another one of the extensions contacting the spring-biased brake mechanism to prevent the machine ball from overrotating, and upon each cut the object is cut through a second slot along the vertical axis and through the opposing slot at the second station.

2. The apparatus of claim 1 wherein the object is fruit.

3. The apparatus of claim 1 wherein the cutting mechanism comprises a blade affixed to a weighted arm that extends approximately parallel to and outwardly therefrom such that the weight is near the tip of the blade, wherein blade is pivotally connected to the frame, and wherein the weight is selected so that the blade is heavy enough to remain in the cutting position while the blade slices through the object and yet allow the blade and weighted arm to pivot to protect the blade and receptacle if the blade comes into contact with the receptacle and fall back down to the cutting position after the receptacle passes.

4. The apparatus of claim 1 further comprising an alignment mechanism disposed along the conveyor before each cutting station.

5. The apparatus of claim 4 wherein the alignment mechanism is a laser alignment mechanism.

6. The apparatus of claim 5 wherein the laser alignment mechanism comprises a sender disposed on one side of the conveyor and a receiver disposed on the side of the conveyor opposite the sender, wherein the sender is aligned with the receiver such that the laser enters a slot of the receptacle and exits the opposing slot and strikes the receiver when the opposing slots are aligned with the cutting mechanism at a cutting station.

7. The apparatus of claim 1 further comprising a pusher track, wherein the at least one receptacle includes a pusher that is adapted to engage the pusher and track and be moved from a first position to a second position.

8. The apparatus of claim 1 wherein the at least one receptacle includes a centering system for centering an object placed therein.

9. The apparatus of claim 8 wherein the centering system comprises a plurality of spring biased knobs extending through the side wall of the at least one receptacle and into the interior thereof.

* * * * *